Sept. 27, 1949.   J. F. GORDON   2,482,972
ELECTRON TUBE TYPE PHONOGRAPH REPRODUCER
Filed Sept. 10, 1945

INVENTOR
JAMES F. GORDON
BY *Robert T. Killman*
ATTORNEY

Patented Sept. 27, 1949

2,482,972

UNITED STATES PATENT OFFICE 2,482,972

ELECTRON TUBE TYPE PHONOGRAPH REPRODUCER

James F. Gordon, Towson, Md., assignor to Bendix Aviation Corporation, South Bend, Ind., a corporation of Delaware Application September 10, 1945, Serial No. 615,353

6 Claims. (Cl. 179—100.41)

This invention relates to displacement sensitive electromechanical transducers and more particularly to a type of phonograph pick-up in which a movable electrode is employed to influence electron flow through a space discharge path.

Several classes of elements are today employed for translating the mechanical variations present in the form of changes in groove depth or groove position on phonograph records into the originally impressed intelligence.

Among the well known types of pick-ups are those utilizing the piezoelectric effect, those converting the motion into electric voltage by virtue of magnetic effects, those employing the variations in resistance of a linear conductor in response to variation in the stress applied thereto and a photo-electric unit in which a movable mirror in a light beam controls the current flow in the photo-electric circuit. Each of these devices suffers from some deficiency to be traced to the particular type of transducer employed.

As is well known, the Rochelle salt piezoelectric pick-up enjoys but a very abbreviated life in the presence of elevated ambient temperature and/or high humidity.

The magnetic unit, while relatively unaffected by variations of humidity and ambient temperature, suffers from the limitations imposed by the relatively great mass required for the development of a useable output voltage, and such units having fairly uniform response over a wide frequency range, i. e., 100 to 8000 cycles, have an output so low that relatively extensive amplification is required to bring the intelligence to a useable level. A further factor detrimental to the magnetic class of pick-ups is its susceptibility to stray alternating magnetic fields.

The strain gauge stress responsive type of pick-up has excellent linearity of output considered both from the standpoint of frequency and amplitude, but again has extremely low output.

The photo-electric type of pick-up has such requirements for auxiliary apparatus and dust-proofing of the pick-up head that its long time commercial practicability appears doubtful.

Accordingly, it is a primary object of this invention to provide a displacement sensitive pick-up responding substantially uniformly over wide frequency ranges and delivering an output level sufficient to drive a low gain amplifier directly.

A further object of the invention is to provide a displacement responsive pick-up unit in which the functions of translating displacement into varying electric voltage and amplification are simultaneously performed within the same unit.

Another object of the invention is to provide a displacement responsive electro-mechanical transducer in which the current flowing through a space discharge path varies in accordance with the controlling displacement.

Still another object of the invention is to provide a new and novel electric discharge device capable of performing the function of amplification and of translating mechanical displacement into varying currents.

Still a further object of the invention is to provide a new and novel displacement responsive pick-up employing means sensitive to applied forces in a predetermined plane to control current flow through a space discharge path, and relatively insensitive to forces applied in other planes in controlling current flow through said discharge path.

The above objects and advantages of the above invention are substantially accomplished in a structure embodying a triode electric discharge valve having its control grid supported by a flexible diaphragm whose contour is such as to have a plane of maximum compliance in the plane of maximum sensitivity of the anode current to electrode displacement.

Other objects and advantages of the invention will in part be disclosed and in part be obvious when the following specification is read in conjunction with the drawings in which Figure 1 is a plan view of the completed pick-up valve;

Figure 1:
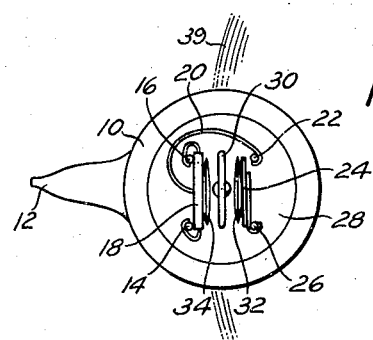
Figure 2:
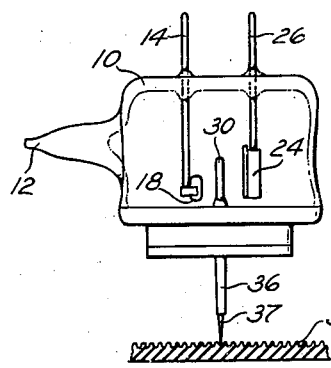
Figure 2 is a view in elevation of the pick-up valve.

Referring now to Figures 1 and 2 of the drawings, the electro-mechanical transducer is seen to comprise an electrode assembly within the envelope 10 provided with an exhaust tubulation 12. The upper portion of the envelope 10 may be of glass or some other insulating material through which rods pass supporting and providing for a connection to the various electrodes. The rods 14 and 16 pass through the upper portion of envelope 10 and support a mica insulator on which there is in turn secured the cathode sleeve 18 having its anterior surface directed away from support rods 14 and 16 coated with one of the well known emissive oxides. Insulated heating filaments are located within the cathode sleeve 18, one end of the heater element being connected to the post 14 and the other to the post 16. A strap 20 extends from the cathode sleeve 18 to the inner end of the post 22 to which it is electrically and mechanically secured. The substantially plane anode 24 is also supported from the upper portion of envelope 10 by the post 26 extending therethrough. Anode 24 is situated within the envelope assembly substantially parallel to the anterior emissive surface of the cathode sleeve 18.

The lower end of the envelope is enclosed by a thin sheet metal diaphragm 28 for which .001 inch stainless steel has been successfully employed and the plane mesh-like grid 30 supported from diaphragm 28 extends between the cathode sleeve 18 and anode 24.

Figure 3:
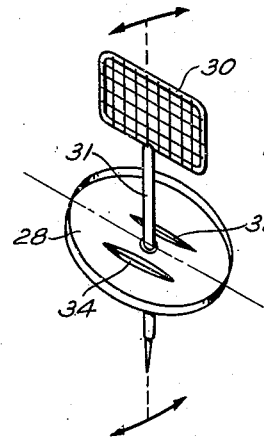
Figure 3 illustrates a grid mount illustrating a means of securing the denied compliance characteristics.
Figure 4:
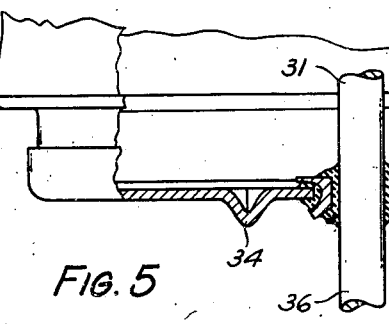
Figure 4 illustrates one method of securing the stylus and grid rod to a flexible diaphragm forming a part of the envelope.
Figure 5:
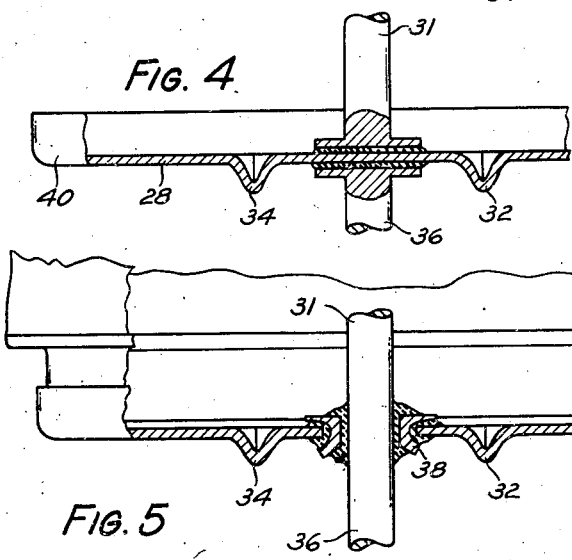
Figure 5 is an alternative method of supporting the grid and driving same through the flexible diaphragm in the envelope.

The details of the grid may be most clearly seen in Figures 3, 4, and 5. The diaphragm as clearly shown in Figure 3 is provided with two linear corrugations running in a direction parallel to the grid element and likewise parallel to the remaining electrodes in the completed assembly as shown in Figure 1. These corrugations 32, 34 increase the compliance of diaphragm 28 in a plane perpendicular thereto while leaving the compliance in the plane parallel to the corrugations 32, 34 substantially unaltered. The grid rod 31 supports the grid assembly 30 from the diaphragm 28 and electrically connects the grid 30 to said diaphragm 28. The grid rod 31 may either be butt welded or brazed to the diaphragm 28 as shown in Figure 4 with the stylus-shank 36 similarly secured to the exterior of diaphragm 28; or the stylus-shank 36 may be but a continuation of the grid rod 31 passing through an eyelet 38 in diaphragm 28 and soldered or brazed to said eyelet. The rim 40 of conductive diaphragm 28 hence offers means for connecting the grid to whatever external electric circuits are desired. The stylus tip 37 of the permanent or semi-permanent type may be cemented in position in the stylus-shank 36 in a manner well known to those skilled in the art and in operation the stylus tip 37 engages the grooves of the conventional type of phonograph record indicated at 39. It will be noted that in the preferred arrangement shown the grooves are substantially parallel to the plane of the various electrodes.

Figure 6:
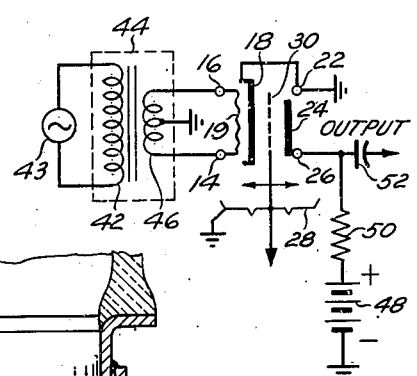
Figure 6 illustrates a circuit suitable for the employment of the displacement sensitive valve assembly as a pick-up.

The pick-up valve may be connected into a circuit such as shown in Figure 6 when it is to be utilized for the reproduction of intelligence from phonograph records. The primary 42 of the transformer 44 is connected to any suitable source 43 of A. C. energy and a center-tapped secondary 46 associated therewith has its end terminals connected across the electrode posts 14 and 16 to heater 19. The center-tap of secondary 46 may be connected to ground as is customary to minimize hum. The cathode sleeve 18 is grounded by the connection of a ground to the terminal post 22, as is the control grid 30 by the connection of the conductive diaphragm 28 to the ground. The anode 24 connected to and supported by the post 26 is energized through anode load resistor 50 from the positive terminal of the direct current source 48 having its negative terminal grounded. The audio frequency voltage resulting from the operation of the device as a pick-up may be impressed on any desired load, such as a subsequent amplifier stage, through coupling capacitor 52 having one terminal thereof connected to the anode 24.

When the apparatus is in use, the emissive cathode 18 is brought to operating temperature by the associated heater 19 fed from the source 43 and the electron flow established between the anode 30 and cathode 18 passes through the load resistor 50, the anode source 48, and the common ground circuit. The magnitude of the current flowing through the discharge path between cathode 18 and anode 24 depends largely upon the electric field existing at the surface of cathode 18. The grid 30 interposed between anode 24 and cathode 18 varies the field distribution within the discharge space, becoming more effective in shielding the cathode from the effects of the anode potential as the grid approaches cathode 24 and conversely. The lateral irregularities in the record grooves, representing the original intelligence, drive the grid 30 to and fro, varying its position between the cathode 18 and anode 24 thus varying the field condition existing at the cathode boundary to control the electrical discharge flowing in accordance with the intelligence present on the driving record surface. The variations in current flow so produced develop a correspondingly varying voltage drop across the anode load resistor 50, which is then available for driving any of the many well known amplifying and reproducer components. Since the grid 30 is connected directly to ground in the circuit shown it is unaffected by the presence of stray electric fields which might otherwise produce hum. For this reason, the approach of the hand of the operator for the purpose of moving the pick-up creates no disturbing phenomena in the output system.

Figure 7:
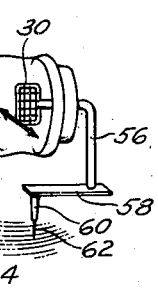
Figure 7 illustrates a stylus suspension providing for enhanced vertical compliance.

For the reduction of vibration pick-up from the mechanical elements driving the turn-table and the elimination of responses resulting from irregularities in the turn-table or of the intelligence bearing discs situated thereon, it is desirable to increase the vertical compliance of the pick-up and this may be done by the arrangement of Figure 7 in which the completed pick-up valve is indicated at 54 with a bent drive rod 56 extending outwardly and downwardly from the diaphragm 28 supporting grid 30 and having at its lower end the resilient leaf spring 58 to whose outer end there is secured the stylus mount 60 carrying stylus point 62 engaging the surface of record 64.

Figure 8:
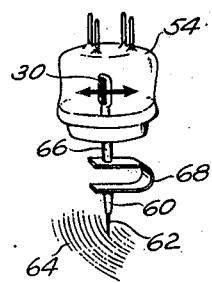
Figure 8 shows an alternative method of increasing the vertical compliance.

An alternative arrangement for the accomplishment of the same purpose is shown in Figure 8 where the completed pick-up valve at 54 is provided with the drive rod 66 extending downwardly from the diaphragm supporting the control grid 30 and the drive rod 66 is secured to a U-shaped resilient element 68 bearing at its lower end the stylus support 60 in which there is secured the stylus point 62 engaging the surface of record 64.

It will be obvious that many other changes and modifications may be made in the invention without departing from the spirit thereof as expressed in the foregoing description and in the appended claims.

What is claimed and desired to be secured by United States Letters Patent is:

1. An envelope defining a substantially vacuous region and having a flexible wall portion, an electron emitter element situated within said envelope, a first electrode situated within said envelope and spaced from said emitter, a second electron permeable electrode situated between said emitter and said first electrode and supported from said flexible wall portion, and means drivingly engaging said flexible wall adapted to engage a grooved surface, said flexible wall having two linear corrugations parallel to said second electron permeable electrode.

2. In a displacement responsive electro-mechanical transducer, an envelope defining a substantially vacuous region and having a flexible wall portion, said flexible wall being provided with at least one linear corrugation, an electron emitting element having a substantially plane emissive surface situated within said envelope with said emissive plane substantially parallel to said corrugation, a first electrode situated within said envelope and spaced from said emitter, a second electrode adapted to influence electron flow between said emitter and said first electrode said second electrode being supported from the portion of said wall portion adjacent said corrugation and a stylus connected to second electrode through said wall.

3. An envelope defining a substantially vacuous region and having a flexible wall portion, an electron emitter element situated within said envelope, a first electrode situated within said envelope and spaced from said emitter, a second electron permeable electrode situated between said emitter and said first electrode and supported from said flexible wall portion, means drivingly engaging said flexible wall, a stylus supported by said means and adapted to engage a grooved surface, said means including a resilient member connected between said means and said stylus to absorb a greater portion of movement imparted to said stylus in a direction perpendicular to said flexible wall without transmitting said movement to said wall, while transmitting through said wall to said second electrode movement imparted to said stylus in directions parallel to said wall.

4. In a displacement responsive electro-mechanical transducer, an envelope defining a substantially vacuous region and having a flexible wall portion, said flexible wall having formed therein a pair of substantially parallel corrugations, said corrugations determining in said wall a plane of relatively great compliance with respect to other planes passing therethrough, an electron emitting element having a substantially plane emissive surface situated within said envelope with said emissive plane substantially perpendicular to the plane of greatest compliance of said wall, a first electrode situated within said envelope and spaced from said emitter, a second electrode adapted to influence electron flow between said emitter and said first electrode, said second electrode being supported from said flexible wall portion between said corrugations, and a stylus connected to said second electrode through said wall.

5. In a displacement responsive electro-mechanical transducer, an envelope defining a region of reduced pressure and having a flexible wall portion, said wall portion having formed therein a pair of transversely directed corrugations, a pair of substantially plane electrodes adapted for the establishment of an electric discharge therebetween situated within said envelope, a support element extending substantially normally from a region of said wall portion lying between said corrugations, said corrugations imparting to said wall a torsional compliance characteristic which is radially non-uniform with respect to said region, an electrode adapted to modify said electric discharge mounted on said support element, and a stylus connected to said support element through said wall.

6. In a displacement responsive electro-mechanical transducer, an envelope defining a region of reduced pressure and having a conductive flexible wall portion, said wall portion having formed therein at least one transversely directed corrugation, a pair of electrodes adapted for the establishment of an electric discharge therebetween situated within said envelope, a conductive support element extending substantially normally from a point of said wall portion adjacent said corrugation and carrying a control electrode adapted to modify said electric discharge, said control electrode extending in substantial parallelism with said corrugation, said corrugation imparting to said wall portion a torsional compliance characteristic which is radially non-uniform with respect to said point, said control electrode being electrically connected with said flexible wall and a stylus carrying member connected with said support element through said wall and supporting a stylus point extending substantially collinearly with said support element.

JAMES F. GORDON.

REFERENCES CITED

The following references are of record in the file of this patent:

UNITED STATES PATENTS

| Number | Name | Date |
|---|---|---|
| 1,831,977 | Sukumlyn | Nov. 17, 1931 |
| 2,165,981 | Sampson | July 11, 1939 |
| 2,191,992 | McLarn | Feb. 27, 1940 |